United States Patent [19]

Mabuchi et al.

[11] 3,956,019

[45] May 11, 1976

[54] BATTERY CASSETTE POWER SOURCE DEVICE

[75] Inventors: Kenichi Mabuchi, Tokyo; Yoshihisa Tsuchimochi, Ichikawa, both of Japan

[73] Assignee: Mabuchi Motor Co. Ltd., Tokyo, Japan

[22] Filed: Oct. 23, 1974

[21] Appl. No.: 517,181

[30] Foreign Application Priority Data

| Oct. 29, 1973 | Japan | 48-121416 |
| Oct. 29, 1973 | Japan | 48-125182[U] |
| Oct. 29, 1973 | Japan | 48-125185[U] |

[52] U.S. Cl. ................................ 136/132
[51] Int. Cl.² ........................................ H01M 2/02
[58] Field of Search .............. 136/132, 87, 173, 171

[56] References Cited

UNITED STATES PATENTS

| 627,917 | 6/1899 | Fuld | 136/132 |
| 1,307,868 | 6/1919 | Lyhne | 136/132 |
| 2,154,653 | 4/1939 | Suketell | 136/173 S |
| 2,397,469 | 4/1946 | Casanov | 136/173 |
| 3,085,127 | 4/1963 | Loris | 136/173 |
| 3,486,945 | 12/1969 | O'Donnell | 136/173 |

Primary Examiner—Howard S. Williams
Assistant Examiner—H. A. Feeley

[57] ABSTRACT

A battery cassette with a longitudinal separator positioned between two rows of battery cells, supply terminal sockets mounted in spaces between the connected cells and end plates at the terminal faces of the cassette, all these elements being enveloped in a thermo-contractive synthetic resinous film.

7 Claims, 10 Drawing Figures

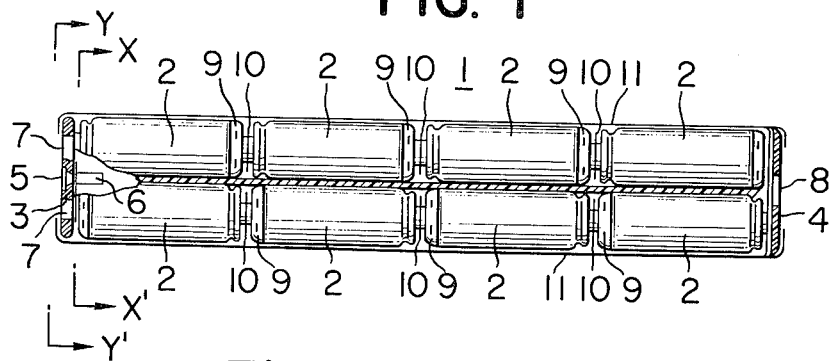
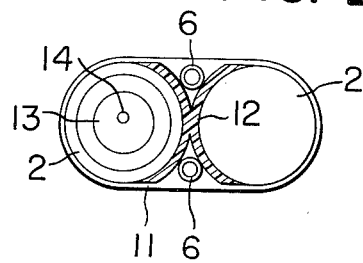
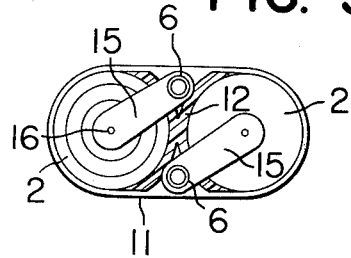
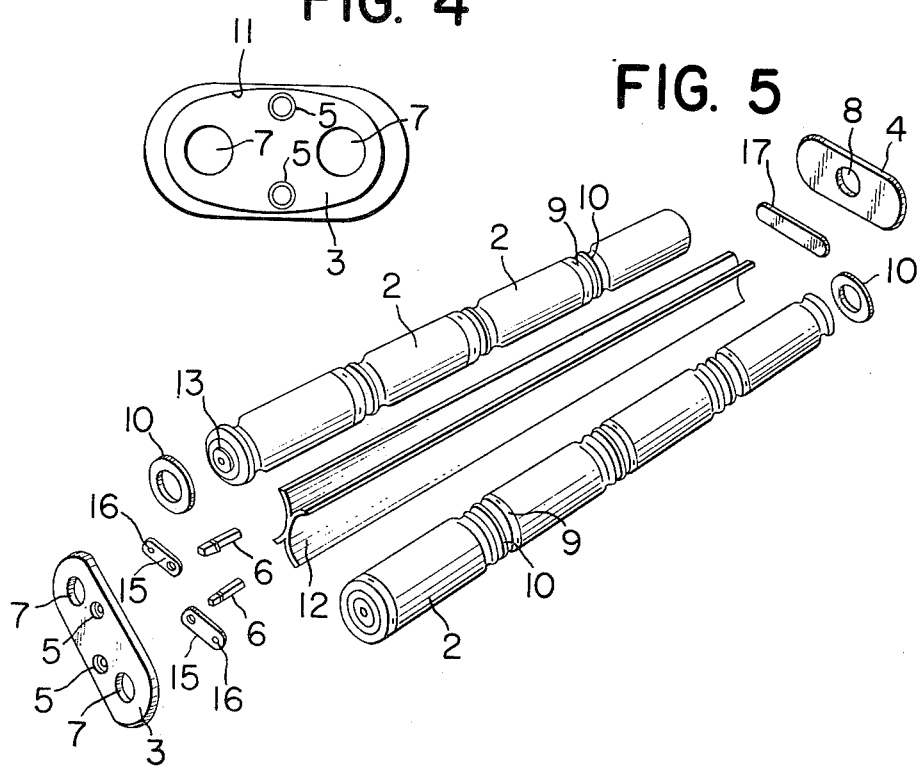

BATTERY CASSETTE POWER SOURCE DEVICE

BACKGROUND OF THE INVENTION

Field of the Invention

This invention relates to a battery cassette power source device and, more particularly, to a battery cassette power source device using a battery cassette in which two parallel rows or trains of cells, the insulating separators positioned between said rows, the end plates of the cassette and other elements are packed and held by means of a thermo-contractive synthetic resin sheet or film.

In battery cassettes using row assemblies of cells, it is necessary to have a reliable insulation between the individual cells and to prevent possible bending or other deformation of the cassette as a whole. It is also required that no member, such as connecting terminals or welded parts which are alive electrically, project or be exposed from the surface of the cassette and, furthermore, that the battery cassette be easily assembled and disassembled. It is desirable to obtain fixing pack means which can satisfy such requirements, yet which are simple and mechanically firm.

It is also required to have the battery cassette readily mountable in and removable from the apparatus in which it is to be used, and that an effective dissipation of heat from the battery cassette when mounted in that apparatus be achieved.

SUMMARY OF THE INVENTION

It is an object of the invention to meet all the above requirements by providing a battery cassette power source with a battery cassette incorporating an assembly of cells packed within a thermo-contractive resin film.

It is another object of the invention to provide a battery cassette power source with a battery cassette in which electrically conductive parts, such as terminals or the like, are not exposed from the surface of the cassette.

It is another object of the invention to provide a battery cassette power source with a battery cassette incorporating an insulating separator which prevents deformation of the cassette.

It is still another object of the invention to provide a battery cassette power source using a pivotally supported plug to which the battery cassette is connected.

It is a further object of the invention to provide a battery cassette power source with a battery cassette readily mountable or removable by the use of one hand.

It is yet a further object of the invention to provide a battery cassette power source which permits an effective escape of heat from the cassette.

BRIEF DESCRIPTION OF THE DRAWINGS

The above and other objects and advantages of the invention will become more apparent from the following detailed description thereof and from the accompanying drawings in which:

FIG. 1 is a plan view, in cross-section, of a battery cassette embodying the invention;

FIG. 2 is a transverse cross-sectional view of the same taken along line X–X' of FIG. 1;

FIG. 3 is the same view as in FIG. 2 showing the connecting plates fixed in place;

FIG. 4 is an end view as seen from line Y–Y' of FIG. 1;

FIG. 5 is an exploded perspective view of the battery cassette as shown in FIG. 1;

DETAILED DESCRIPTION OF THE EMBODIMENT

Figure 6:
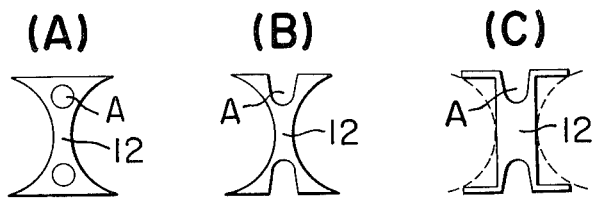
FIGS. 6A, 6B and 6C show other end views of variants in the insulating separator.

Referring now to the accompanying drawings, wherein same reference numerals denote same elements, the battery cassette 1 comprises a plurality of electric cells 2 shown in two parallel rows with an insulating front end plate 3 which serves also as the socket base and a rear end plate 4. Socket holes 5 are provided in the front end plate 3 to allow the supply terminal sockets 6 to pass therethrough, while other apertures 7 also provided in the plate 3 are for purpose of ventilation and serve also for welding the connecting plates. A single aperture 8 is formed in the rear end plate 4. Connecting caps 9 are connecting the individual cells to one another and have insulating washers 10 associated therewith. A film of thermo-contractive synthetic resin 11 such as, for instance, thermo-contractive vinyl resin, covers the entire of the cassette, as shown in FIG. 3. An insulating separator 12 divides longitudinally the two rows of cells, reference numeral 13 shows the positive terminal of the cell, 14 shows the gas discharge hole. The end connecting plates 15 are provided with welding points 16 and are located at one end face of th cell rows, while another conducting plate 7 is positioned at the opposite end face as clearly seen in FIG. 5.

In the battery cassette 1 embodying the invention, the cells 2 are connected to one another in series connection by welding the connecting caps 9 thereto with the respective insulating washers 10 interposed. The rows or trains of cells, united by said welding, are engaged by the insulating separator 12 on both sides thereof. As shown in FIG. 2, supply terminal sockets 6 are mounted in the spaces formed by the curved insulating separator 12 which has substantially an x-shaped cross-section. As shown in FIG. 3, the connecting plates 15 are welded to the sockets 6 and to the cells 2, although said welding to the cells 2 is done after the entire cassette has been packed as will be described later. Thus, in FIG. 3, the sockets 6, with connecting plates 15 fixed thereto are placed in the above-mentioned spaces formed by the insulating separator 12 and, on the rear end side, the conductive plate 17 is welded to the cells, after which the rear end plate 4 is mounted in place.

With the front end plate 3 and the rear end plate 4 mounted in place, the entire assembly is fixedly packed within the thermo-contractive synthetic resinous film 11. At this time, it is needless to say that the socket apertures 5 of the front end plate 3 are positioned opposited to the mouths of the sockets 6 into which plugs are to be inserted. In this process, the thermo-contractive synthetic resin film 11 is placed so as to engage the peripheries of the end plates 3 and 4 as shown in FIG. 4 so that the entire battery cassette is rigidly fixed only by the thermo-contractive synthetic resin film 11. Thereafter, as clearly shown in FIGS. 4 and 5, the ends of the connecting plates 15 are welded to cells 2 as at 16, the apertures 7 in the front end plate 3 providing the necessary access for such purpose. The apertures 7 also serve, together with the aperture 8, to permit the escaping from the cassette of gas which may be discharged from the gas relief holes 14 provided in the positive terminals 13 of the cells.

Other variant forms of the insulating separator 12 are shown in FIGS. 6 (A), (B) and (C). Like the insulating separator shown in FIG. 2, they have a generally x-shaped or nearly H-shaped cross-section so as to prevent bending. The reference numeral A in these figures shows socket mounting spaces in which source terminal sockets 6 are to be mounted as previously mentioned.

Figure 7:
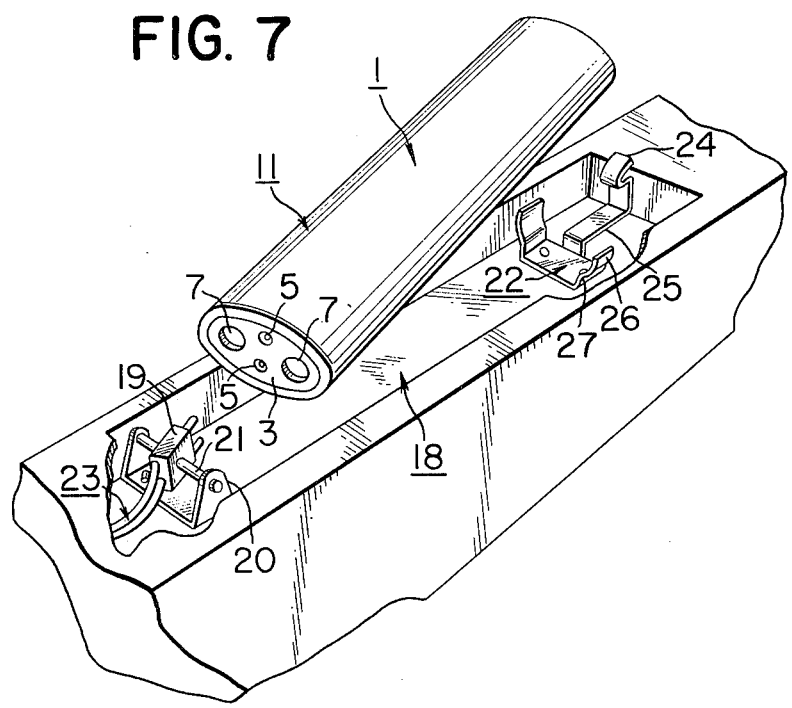
FIG. 7 is a perspective view showing an example of the space for receiving the battery cassette.

FIG. 7 shows a battery cassette receiving space suitable for accommodation of a battery cassette such as the one described above. In this figure, reference numerals 1, 3 and 5 correspond to those in FIG. 1 and with numeral 11 is denoted a thermo-contractive synthetic resin film for packing the battery cassette. The space 18 for receiving the battery cassette comprises therewithin a plug 19, the plug supporting base 20 with a pivot 21 positioned on said supporting base, a holder 22 for removably holding the rear end of the cassette 1 and a lead-in cord 23.

The battery cassette receiving space 18 comprises a recess sufficiently large to accommodate the cassette 1 in the central region of the recess.

As shown in the figure, the cassette 1 may be mounted by bringing the apertures 5 in the front end plate 3 of the cassette into alignment with the pivotally supported plug 19 and fitting the plug into said apertures 5 so that electrical energy may be drawn by means of the cord 23. Thereupon, the rear end portion of the cassette is held by fitting it into the holder 22. When the cassette 1 is to be removed, the hook 24 which is integral with the holder 22 is pushed aside to release the rear end of the cassette 1, the cassette is then lifted and the plug 19 is disengaged from apertures 5.

Thus, it is to facilitate the mounting and removal of the cassette by a single hand that the holder 22 is provided with a hook 24 over which the rear end edge of the cassette 1 may be slid at the time of mounting of the cassette. By simply pushing downwardly the rear end portion of the cassette, the rear end edge of the cassette slides along the slanted surface of the hook 24 and causes the resilient portion 25 to be deflected whereby the rear end edge of the cassette slips into the underside of the hook 24 and is held by the latching portion of the hook. Concurrently, the clamping portion 26 catches the cassette 1 on both its sides. In removing the cassette, one depresses the hook 24 away from the cassette in a direction nearly normal to the slanted surface of the hook 24, so that the resilient portion 25 deflects downward so as to push up the cassette. The cassette is then swung about shaft 21 and pulled away from plug 19. In this way the cassette 1 may be mounted and removed by using a single hand. In addition, the cassette holding means 22 is very economical to manufacture since it may be made merely by a stamping operation. It is needless to say that a snap-action mechanism may be used with the foregoing mounting and removal mechanism.

Figure 8:
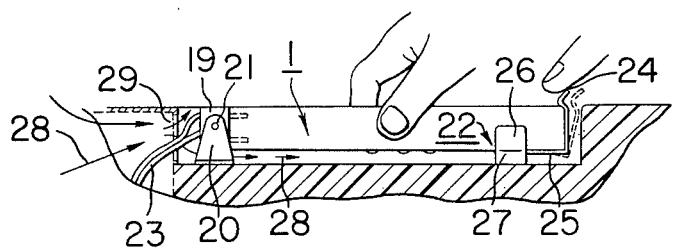
FIG. 8 is a side view of the battery cassette as mounted in the cassette receiving space, shown partially in cross-section.

Reference is made again to FIG. 8 regarding the cooling effect which is especially important where nickel-cadmium type cells of recent development are used as the cells in the invention. When the battery is held in the position as shown in FIG. 8, the upright portion 27 of the holder 22 functions to keep the cassette 1 spaced upward from th bottom surface of the cassette accommodating recess. Also the front end portion of the cassette 1, into which the plug is inserted, is so designed that the cassette will not contact the bottom of the recess 18.

With the cassette 1 kept and held in place as mentioned above, cooling air flow 28 enters the recess 18 through the ventilating apertures 29 and cools efficiently the entire surface of the cassette 1 as it passes over the cassette toward the rear end, whereby any heat emitting from the cassette 1 through its thermo-contractive synthetic resinous film may be effectively removed.

As understood from the foregoing description, the invention has provided a battery cassette which incorporates an insulating separator 12 for engaging the row or train of cells and serving also as the backbone of the whole cassette whereby the cassette as a whole is rigidly fixed without deformation or bending, simply by packing it in a thermo-contractive synthetic resin film.

Further, since none of the metallic parts, such as the connecting plates 15, the conducting plate 17, the supply connection sockets 6 and the connecting caps 9, is exposed or projects out of the periphery of the cassette, the packing in the thermo-contractive synthetic resin film 11 can be done easily and the individual cells 2 in the cassette are prevented from careless short-circuiting.

Moreover, because the plug 19 is pivotally supported by means of shaft 21, it is easy to insert the plug into or remove it from the socket holes 5 of the cassette 1 without incurring undue mechanical stress. The cassette may be handled single-handedly in mounting or removing thereof and an effective heat removal construction is made available.

Numerous changes may be made in the above described battery cassette power source device, and different embodiments of the present invention may be made without departing from the scope thereof. Therefore, it is to be understood that all matter contained in the foregoing descriptions and in the accompanying drawing is to be interpreted solely as illustrative of the invention and not in a limiting sense.

What is claimed is:

1. A battery power source device comprising a battery cassette, two side-by-side rows of cells connected to each other in series, a recess in said device for accommodating said battery cassette, an insulating separator extending longitudinally within the cassette to engage and separate said two rows of cells, two terminal sockets mounted in longitudinal spaces between said two side-by-side rows of cells; two connecting plates positioned on a first one of the end faces of said cassette and a single connecting plate positioned on a second one of the end faces of said cassette, each of said two connecting plates electrically coupling one of said two batteries at said first end to one of said sockets, said single connecting plate electrically coupling said batteries at said second end to each other, a plug electrically connected to said sockets, said plug including a lead-in cord that is adapted to be connected to an apparatus that is to be powered by said batteries; and an envelope containing all of said foregoing elements but not said plug, said envelope being made of a thermo-contractive synthetic resinuous film.

2. A battery power source device as claimed in claim 1, in which each of said two connecting plates at said first end has apertures therein positioned in alignment with one extremity of said terminal sockets.

3. A battery power source device as claimed in claim 1, in which said insulating separator has a substantially x-shaped or H-shaped cross-section.

4. A battery power source device as claimed in claim 1, in which said plug is supported on a pivoting shaft to facilitate the mounting of the battery cassette into the recess.

5. A battery power source device as claimed in claim 4, in which said plug is located at one extremity of said recess, while at the opposite extremity thereof there is located a battery cassette retainer for rigidly holding the nonswinging end of the battery cassette.

6. A battery power source device as claimed in claim 5, in which said battery cassette retainer comprises a hook supported by a resilient member, said hook having a slanted upper surface which slidably engages said non-swinging end of the battery cassette.

7. A battery power source device as claimed in claim 1, in which teh battery cassette is held in position within said recess with at least one portion thereof spaced from the bottom surface of the recess to allow heat dissipation from the recess.

* * * * *